(12) United States Patent
Lee et al.

(10) Patent No.: US 6,528,546 B2
(45) Date of Patent: Mar. 4, 2003

(54) RECYCLING OF ARTICLES COMPRISING HYDROXY-PHENOXYETHER POLYMERS

(75) Inventors: Robert A. Lee, Bowdon (GB); Gerald A. Hutchinson, Coto de Caza, CA (US); Basharat A. Nazir, High Wycombe (GB)

(73) Assignee: Advanced Plastics Technologies, Ltd. (GB)

( * ) Notice: Subject to any disclaimer, the term of this patent is extended or adjusted under 35 U.S.C. 154(b) by 0 days.

(21) Appl. No.: 09/742,887

(22) Filed: Dec. 20, 2000

(65) Prior Publication Data

US 2002/0019449 A1 Feb. 14, 2002

Related U.S. Application Data

(60) Provisional application No. 60/172,714, filed on Dec. 20, 1999, provisional application No. 60/194,959, filed on Apr. 5, 2000, provisional application No. 60/212,919, filed on Jun. 20, 2000, and provisional application No. 60/228,188, filed on Aug. 25, 2000.

(51) Int. Cl.⁷ ................................................. C08J 11/04
(52) U.S. Cl. ............................ 521/48; 521/40; 264/918
(58) Field of Search ...................... 521/40, 48; 264/918

(56) References Cited

U.S. PATENT DOCUMENTS

| 5,089,588 | A | 2/1992 | White et al. |
|---|---|---|---|
| 5,115,075 | A | 5/1992 | Brennan et al. |
| 5,143,998 | A | 9/1992 | Brennan et al. |
| 5,149,768 | A | 9/1992 | White et al. |
| 5,164,472 | A | 11/1992 | White et al. |
| 5,218,075 | A | 6/1993 | Brennan et al. |
| 5,246,751 | A | 9/1993 | White et al. |
| 5,275,853 | A | 1/1994 | Silvis et al. |
| 5,464,924 | A | 11/1995 | Silvis et al. |
| 5,472,753 | A | 12/1995 | Farha |
| 5,814,373 | A | 9/1998 | White et al. |
| 5,834,078 | A | 11/1998 | Cavitt et al. |
| 5,840,772 | A | 11/1998 | Peters et al. |
| 5,962,093 | A | 10/1999 | White et al. |
| 6,051,294 | A | 4/2000 | White et al. |
| 6,180,715 | B1 | 1/2001 | Schmidt |

FOREIGN PATENT DOCUMENTS

| EP | 0 376 119 | 7/1990 |
|---|---|---|
| EP | 1 041 116 A2 | 10/2000 |
| WO | WO 97/23564 | 7/1997 |
| WO | WO98/14498 | 4/1998 |
| WO | WO 98/17470 | 4/1998 |
| WO | WO98/29491 | 7/1998 |
| WO | WO99/12995 | 3/1999 |
| WO | WO 99/20673 | 4/1999 |
| WO | WO 99/23134 | 5/1999 |
| WO | WO 99/32281 | 7/1999 |
| WO | WO 99/48962 | 9/1999 |
| WO | WO 00/01750 | 1/2000 |
| WO | WO 00/20484 | 4/2000 |

*Primary Examiner*—Edward J. Cain
*Assistant Examiner*—Katarzyna W. Lee
(74) *Attorney, Agent, or Firm*—Knobbe, Martens, Olson & Bear, LLP

(57) ABSTRACT

Disclosed are methods of recycling the components of composite articles and materials comprising hydroxy-phenoxyether polymers to facilitate reuse of such components. The recycling methods comprise dissolution of the hydroxy-phenoxyether polymer in an acidic solution which is separated from the other components which formed the composite article or material. The hydroxy-phenoxyether polymers may be reused as the acidic solution, or they may be precipitated by addition of a base prior to reuse.

20 Claims, 4 Drawing Sheets

Recycling Process for Barrier Bottles
made of PET and Hydroxy-Phenoxyether Polymers

Recycling Process for Articles made with Hydroxy-Phenoxyether Polymers and Fibers Recycling Process for Paper Products made with Hydroxy-Phenoxyether Polymers Sources of and Uses for Recycled
Hydroxy-Phenoxyether Polymer

RECYCLING OF ARTICLES COMPRISING HYDROXY-PHENOXYETHER POLYMERS

PRIORITY APPLICATION INFORMATION

This application claims priority under 35 U.S.C. § 119(e) to the following U.S. provisional applications: Ser. No. 60/172,714, filed Dec. 20, 1999, Ser. No. 60/194,959, filed Apr. 5, 2000, Ser. No. 60/212,919, filed Jun. 20, 2000, and Ser. No. 60/228,188, filed Aug. 25, 2000, the disclosures of which are hereby incorporated by reference in their entireties.

BACKGROUND OF THE INVENTION

1. Field of the Invention

The present invention relates to methods of recycling the components of composite articles and materials comprising hydroxy-phenoxyether polymers to facilitate reuse of such components.

2. Description of the Related Art

Polymeric materials are used widely in many industries, including the packaging industry and the textiles industry. Recycling of plastics has increased greatly over the past decade in response to largely environmental concerns such as diminishing landfill space. This has created a demand for materials and methods which allow for recycling and reuse.

One special issue which arises is that presented by use of multiple materials in a single item. In the packaging industry, a container may comprise more than one type of plastic. For example, it is known to include layers of certain polymers within thin-walled food and beverage containers comprised primarily of PET as a barrier against the unwanted transmission of gases such as oxygen and carbon dioxide. One example of such barrier containers are those described in WO 99/20462, entitled Barrier Coated Polyester. In order to efficiently recycle the materials used in such items, methods used for recycling should be able to separate the recycled item into its component materials so each may be reused.

SUMMARY OF THE INVENTION

The disclosed methods of recycling the components of articles such as barrier containers and composite packaging materials comprising hydroxy-phenoxyether polymers facilitate reuse of the hydroxy-phenoxyether polymer as well as the other components such as polyethylene terephthalate and cellulose. According to preferred embodiments, the recycling methods use water as the primary solvent and also use common acids and bases, making such methods highly efficient from the standpoint of materials costs. In preferred embodiments, the methods are environmentally conscious in that they use materials that are generally safe to handle, and that the waste produced in preferred embodiments is essentially neutral and aqueous allowing for recycling or disposal with little negative environmental impact.

In accordance with one embodiment, there is provided a method of obtaining recycled hydroxy-phenoxyether polymers from articles comprising hydroxy-phenoxyether polymers. The method comprises providing an article comprising a hydroxy-phenoxyether polymer, and contacting the article with an aqueous solution comprising 1–50% acid by weight to at least partially dissolve the hydroxy-phenoxyether polymer to form an acidic hydroxy-phenoxyether polymer solution. The method continues with separation of the acidic hydroxy-phenoxyether polymer solution from any solids present, addition of a base to the acidic hydroxy-phenoxyether polymer solution to form a hydroxy-phenoxyether polymer precipitate, and separation of the hydroxy-phenoxyether polymer precipitate. In a preferred embodiment, the aqueous solution comprises 5–20% acid by weight. The method may further comprise one or more of the following: cleaning and/or processing the article into smaller pieces; rinsing and/or drying the hydroxy-phenoxyether polymer precipitate following its separation; and processing the hydroxy-phenoxyether polymer precipitate by pelletizing, pulverizing, grinding, extrusion, molding, or compounding.

In accordance with another embodiment of the present invention, there is provided a method of isolating a hydroxy-phenoxyether polymer from a composite material. The method comprises providing a composite material, contacting the composite material with an aqueous solution having a pH below about pH 4 to form dissolved hydroxy-phenoxyether polymer, separating the dissolved hydroxy-phenoxyether polymer from what remains of the composite material, adding a base to the dissolved hydroxy-phenoxyether polymer in a quantity sufficient to raise the pH to at least pH 6, and isolating the hydroxy-phenoxyether polymer precipitate which forms as a result of the addition of the base.

In accordance with another embodiment of the present invention, there is provided a method of recycling barrier containers comprising polyethylene terephthalate and hydroxy-phenoxyether polymer. The method comprises processing the barrier containers into smaller pieces, contacting the pieces with an aqueous solution having a pH below about pH 4, thereby forming a mixture comprising acidic hydroxy-phenoxyether polymer solution and polyethylene terephthalate pieces, separating the polyethylene terephthalate pieces from the acidic hydroxy-phenoxyether polymer solution, precipitating the acidic hydroxy-phenoxyether polymer solution by adding an alkaline material until the pH has been raised to at least pH 6, and isolating the hydroxy-phenoxyether polymer precipitate. In one preferred embodiment, the aqueous solution has a pH at or below pH 3.5.

In accordance with another embodiment of the present invention, there is provided a method of recycling articles comprising cellulose fiber and hydroxy-phenoxyether polymer, contacting the article with an aqueous solution having a pH below about pH 4, thereby forming a mixture comprising aqueous hydroxy-phenoxyether polymer and cellulose fiber, separating the cellulose fiber from the aqueous hydroxy-phenoxyether polymer, raising the pH of the aqueous hydroxy-phenoxyether polymer to at least pH 6, thereby precipitating at least some of the hydroxy-phenoxyether polymer, and isolating the precipitated hydroxy-phenoxyether polymer. In one preferred embodiment, the aqueous solution has a pH at or below pH 3.5.

In accordance with another embodiment of the present invention, there is provided a method of obtaining recycled hydroxy-phenoxyether polymer solution from articles comprising hydroxy-phenoxyether polymers. The method comprises providing an article comprising a hydroxy-phenoxyether polymer, contacting the article with an aqueous solution having a pH below about pH 4 to at least partially dissolve the hydroxy-phenoxyether polymer to form an acidic hydroxy-phenoxyether polymer solution, and separating the acidic hydroxy-phenoxyether polymer solution from any solids or other materials present to isolate the hydroxy-phenoxyether polymer solution.

DETAILED DESCRIPTION OF THE PREFERRED EMBODIMENT

Introduction

Figure 1:
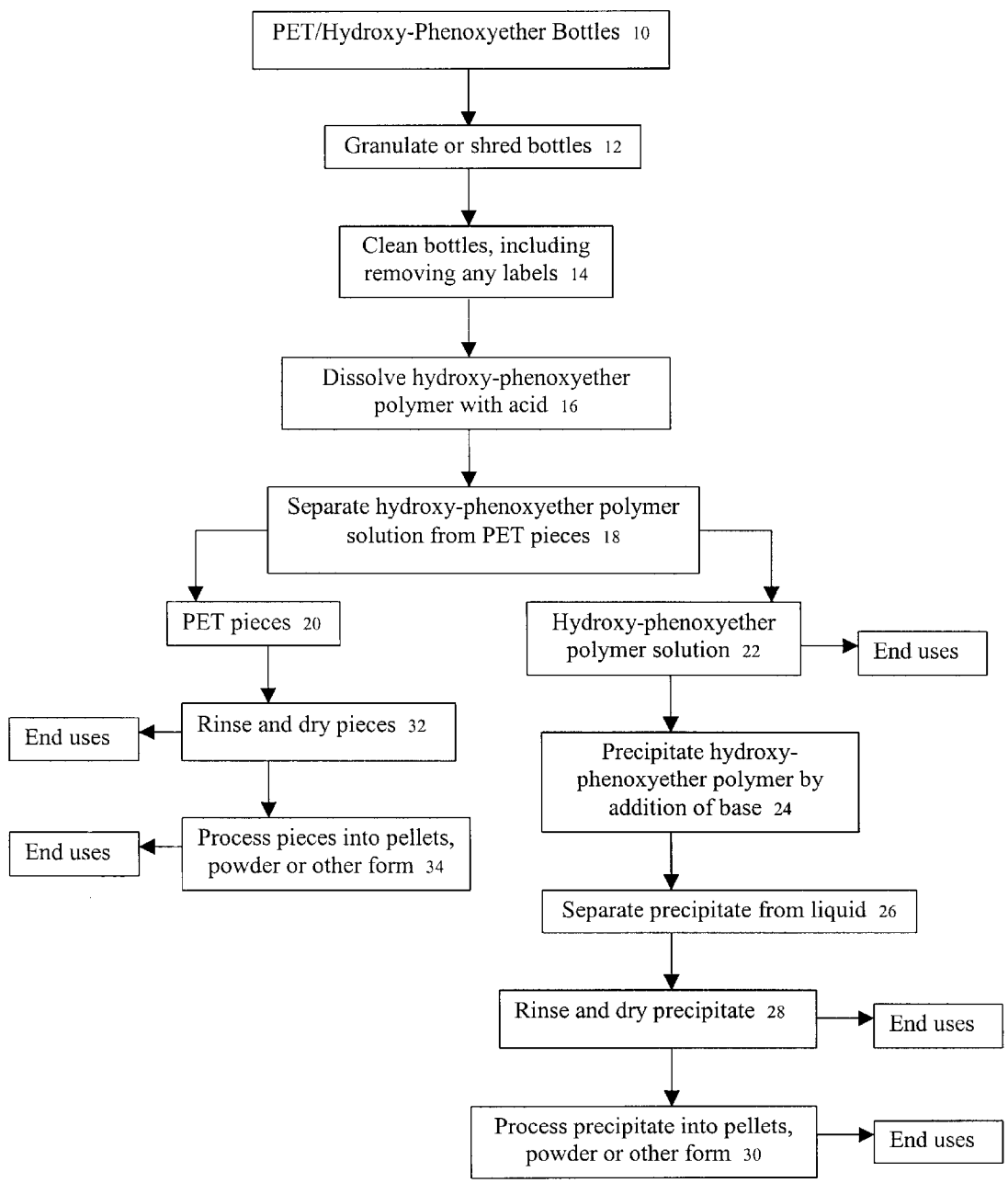
FIG. 1 is a flow chart showing a recycling process for barrier bottles made of PET and hydroxy-phenoxyether polymers according to one preferred embodiment of the present invention.

A class of materials which have been recently found to be useful in the creation of packaging materials are the plastics in the hydroxy-phenoxyether polymer family. These materials lend excellent gas-barrier properties to plastic food and beverage containers, as described in WO 99/20462. In addition, they provide greater flexibility, cushioning, grease and water resistance, resiliency, and structural strength to paper and molded fiber materials. Methods and materials utilizing hydroxy-phenoxyether polymers in combination with cellulose and other fibers are described in Assignee's copending applications: HYDROXY-PHENOXYETHER POLYMERS IN PAPERMAKING, application Ser. No. 09/745,013, filed on Dec. 20, 2000; LAMINATES AND COATED MATERIALS COMPRISING HYDROXY-PHENOXYETHER POLYMERS, application Ser. No. 09/745,002, filed on Dec. 20, 2000; and HYDROXY-PHENOXYETHER POLYMER/FIBER COMPOSITES AND FOAMS, application Ser. No. 09/742,2 10, filed on Dec. 20, 2000.

Economic and environmental factors provide a need for methods allowing for recycling and eventual reuse of hydroxy-phenoxyether polymers and the other materials used in the packaging materials discussed above, as well as any other article or item which comprises hydroxy-phenoxyether polymers. The methods discussed below and shown in the figures in reference to barrier coated plastic bottles and coated or impregnated paper items are meant to be exemplary, with the basic principles being applicable to other recycling of other items comprising hydroxy-phenoxyether polymers and materials other than PET or cellulose.

Hydroxy-Phenoxyether Polymers

As used herein, the term "hydroxy-phenoxyether polymer" means a polymer having aromatic ether moieties in its backbone chain and pendant hydroxyl groups. Hydroxy-phenoxyether polymers are known, see e.g. U.S. Pat. Nos. 6,011,111; 5,834,078; 5,814,373; 5,464,924; and 5,275,853; see also PCT Application Nos. WO 99/48962; WO 99/12995; WO 98/29491; and WO 98/14498. However, these disclosures do not discuss recycling of such materials. Preferred hydroxy-phenoxyether polymers are as follows:

(1) hydroxy-functional poly(amide ethers) having repeating units represented by any one of the Formulae Ia, Ib or Ic:

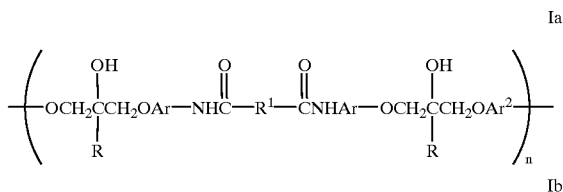

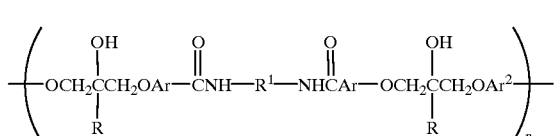

or

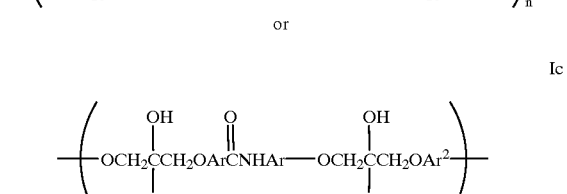

(2) poly(hydroxy amide ethers) having repeating units represented independently by any one of the Formulae IIa, IIb or IIc:

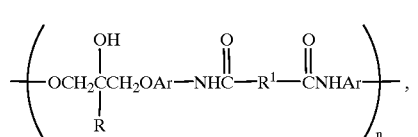

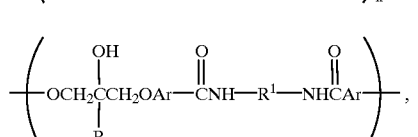

or

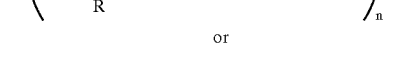

(3) amide- and hydroxymethyl-functionalized polyethers having repeating units represented by Formula III:

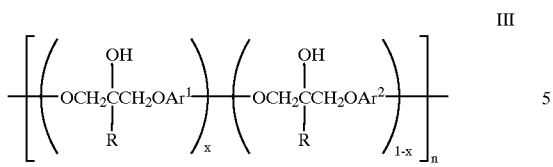

III (4) hydroxy-functional polyethers having repeating units represented by Formula IV:

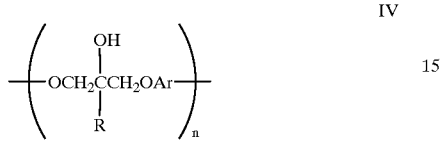

IV (5) hydroxy-functional poly(ether sulfonamides) having repeating units represented by Formulae Va or Vb:

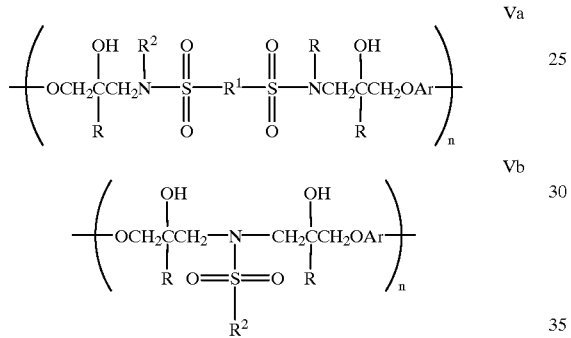

Va

Vb (6) poly(hydroxy ester ethers) having repeating units represented by Formula VI:

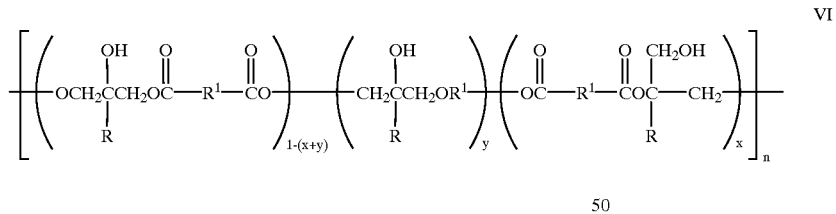

VI (7) hydroxy-phenoxyether polymers having repeating units represented by Formula VII:

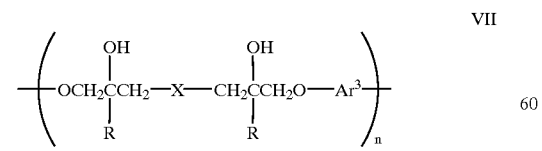

VII and (8) poly(hydroxyamino ethers) having repeating units represented by Formula VIII:

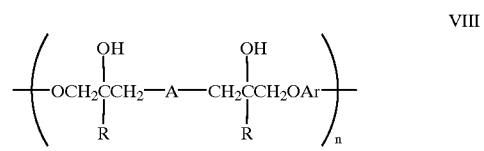

VIII wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar_1$ is a divalent aromatic moiety or combination of divalent aromatic moieties bearing amide or hydroxymethyl groups; each $Ar_2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R_1$ is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; $R_2$ is individually a monovalent hydrocarbyl moiety; A is an amine moiety or a combination of different amine moieties; X is an amine, an arylenedioxy, an arylenedisulfonamido or an arylenedicarboxy moiety or combination of such moieties; and $Ar_3$ is a "cardo" moiety represented by any one of the Formulae:

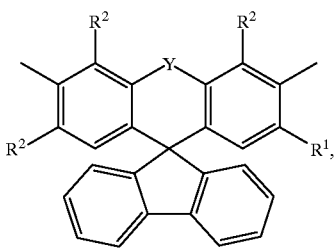

-continued

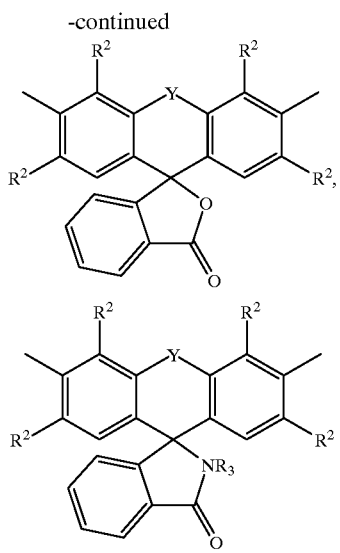

wherein Y is nil, a covalent bond, or a linking group, wherein suitable linking groups include, for example, an oxygen atom, a sulfur atom, a carbonyl atom, a sulfonyl group, or a methylene group or similar linkage; $R^1$ and $R^2$ are independently hydrogen, halogen, a hydrocarbyl or substituted hydrocarbyl, wherein hydrocarbyl is a monovalent hydrocarbon such as alkyl, cycloalkyl, aralkyl, or aryl and the substituent(s) is a monovalent moiety which is inert in the reactions used to prepare the polymer; and $R_3$ is hydrogen, a hydrocarbyl or substituted hydrocarbyl wherein hydrocarbyl is as defined previously and the substituent(s) is also as defined previously. Examples of such substituents include hydroxy, cyano and halo moieties. Preferably, n is an integer from about 10 to about 1000; x is 0.01 to 1.0; and y is 0 to 0.5.

The term "predominantly hydrocarbylene" means a divalent radical that is predominantly hydrocarbon, but which optionally contains a small quantity of a heteroatomic moiety such as oxygen, sulfur, imino, sulfonyl, sulfoxyl, and the like.

The hydroxy-functional poly(amide ethers) represented by Formula I are preferably prepared by contacting an N,N'-bis(hydroxyphenylamido)alkane or arene with a diglycidyl ether as described in U.S. Pat. Nos. 5,089,588 and 5,143,998 (both incorporated herein by reference in their entirety).

The poly(hydroxy amide ethers) represented by Formula II are prepared by contacting a bis(hydroxyphenylamido) alkane or arene, or a combination of 2 or more of these compounds, such as N,N'-bis(3-hydroxyphenyl)adipamide or N,N'-bis(3-hydroxyphenyl)glutaramide, with an epihalohydrin as described in U.S. Pat. No. 5,134,218 (incorporated herein by reference in its entirety).

The amide- and hydroxymethyl-functionalized polyethers represented by Formula III can be prepared, for example, by reacting the diglycidyl ethers, such as the diglycidyl ether of bisphenol A, with a dihydric phenol having pendant amido, N-substituted amido and/or hydroxyalkyl moieties, such as 2,2-bis(4-hydroxyphenyl)acetamide and 3,5-dihydroxybenzamide. These polyethers and their preparation are described in U.S. Pat. Nos. 5,115,075 and 5,218,075 (both incorporated herein by reference in their entirety).

The hydroxy-functional polyethers represented by Formula IV can be prepared, for example, by allowing a diglycidyl ether or combination of diglycidyl ethers to react with a dihydric phenol or a combination of dihydric phenols using the process described in U.S. Pat. No. 5,164,472. Alternatively, the hydroxy-functional polyethers are obtained by allowing a dihydric phenol or combination of dihydric phenols to react with an epihalohydrin by the process described by Reinking, Barnabeo and Hale in the Journal of Applied Polymer Science, Vol. 7, p. 2135 (1963) (both the patent and journal article of this paragraph are incorporated herein by reference in their entirety).

The hydroxy-functional poly(ether sulfonamides) represented by Formula V are prepared, for example, by polymerizing an N,N'-dialkyl or N,N'-diaryldisulfonamide with a diglycidyl ether as described in U.S. Pat. No. 5,149,768 (incorporated herein by reference in its entirety).

The poly(hydroxy ester ethers) represented by Formula VI are prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820 (incorporated herein by reference in its entirety).

The hydroxy-phenoxyether polymers represented by Formula VII are prepared, for example, by contacting at least one dinucleophilic monomer with at least one diglycidyl ether of a cardo bisphenol, such as 9,9-bis(4-hydroxyphenyl) fluorene, phenolphthalein, or phenolphthalimidine or a substituted cardo bisphenol, such as a substituted bis (hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. These hydroxy-phenoxyether polymers are described in U.S. Pat. No. 5,814,373 (incorporated herein by reference in its entirety).

The poly(hydroxyamino ethers) ("PHAE" or polyetheramines) represented by Formula VIII are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These compounds are described in U.S. Pat. No. 5,275,853 (incorporated herein by reference in its entirety).

Thermoplastic phenoxy materials suitable for use in the preferred embodiments of this invention include those commercially available from Phenoxy Associates, Inc. These hydroxy-phenoxyether polymers are the condensation reaction products of a dihydric polynuclear phenol, such as bisphenol A, and an epihalohydrin and have the repeating units represented by Formula IV wherein Ar is an isopropylidene diphenylene moiety. A process for preparing these is described in U.S. Pat. No. 3,305,528 (incorporated herein by reference in its entirety).

Phenoxy-type thermoplastics of Formulae I–VIII may be obtained commercially from Dow Chemical Company (Midland, Mich. U.S.A.). Especially preferred hydroxy-phenoxyether polymers are the poly(hydroxyamino ethers) ("PHAE" or polyetheramines) represented by Formula VIII, such as XU19040.00L or BLOX 0005 available from The Dow Chemical Company. Materials having melt indices of 20 and 5 have been found to be preferred in accordance with some preferred embodiments. In one preferred embodiment, the hydroxy-phenoxyether polymer has the chemical structure below:

Dissolution of Hydroxy-Phenoxyether Polymers

Following preparation, the flakes are combined with a solution, preferably a primarily aqueous solution, comprising at least one acid to dissolve the hydroxy-phenoxyether polymer 16. Preferred acids include both organic acids and inorganic acids. Preferred organic acids include, but are not limited to, carboxylic acids such as acetic acid and propionic acid, dicarboxylic acids such as oxalic acid, and hydroxy-

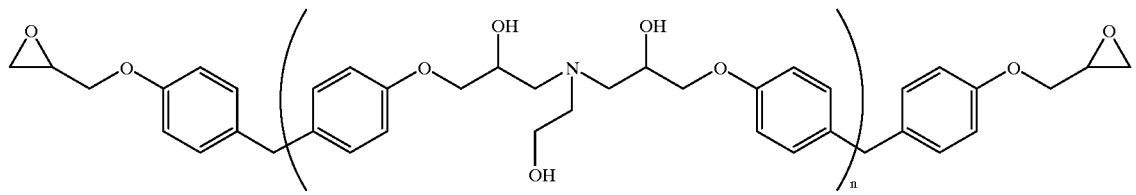

Preparation of Articles Containing Materials to be Recycled

Figure 2:
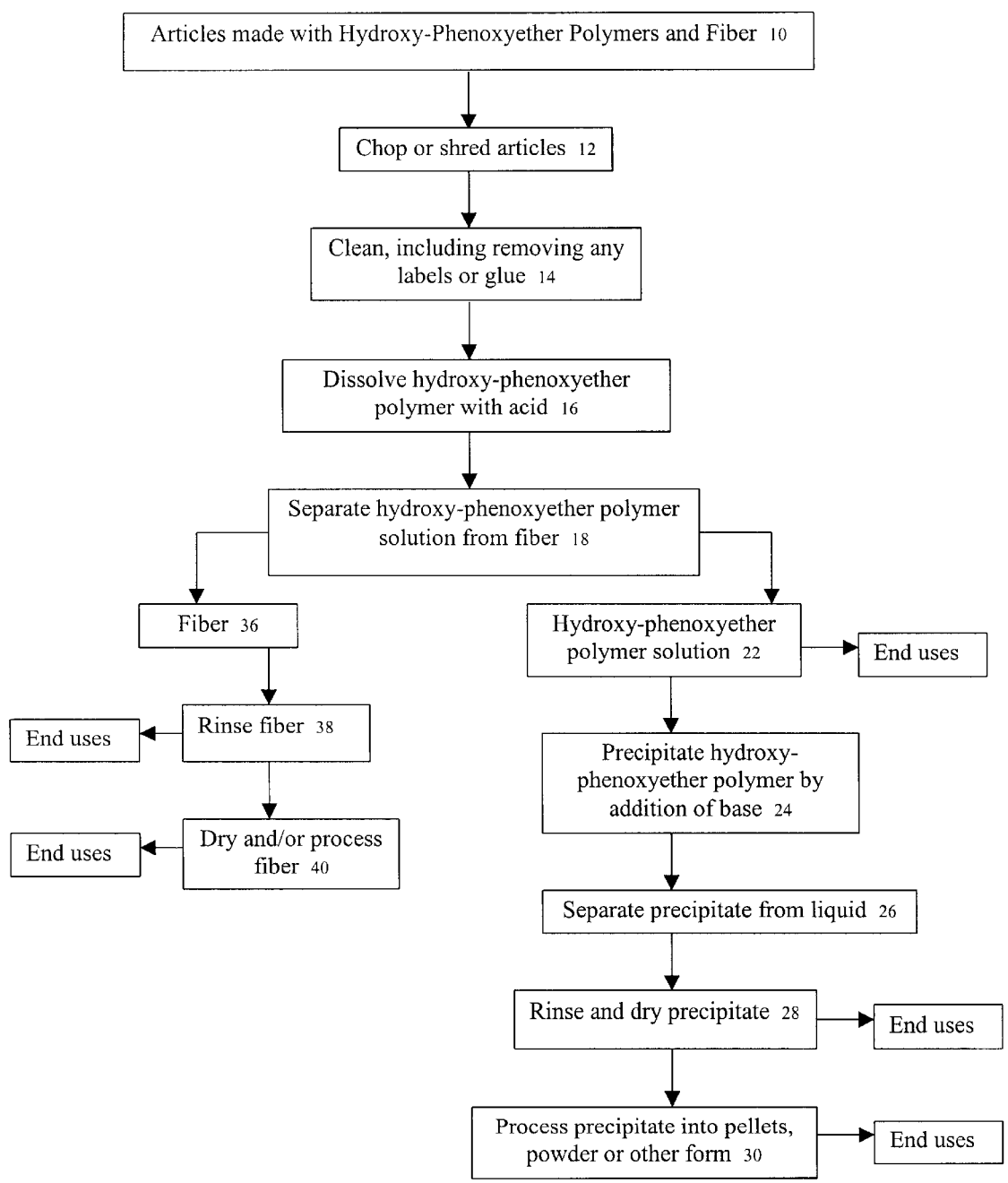
FIG. 2 is a flow chart showing a recycling process for products made with hydroxy-phenoxyether polymers and fibers according to one preferred embodiment of the present invention.

As noted in FIGS. 1 and 2, the first step(s) in preferred recycling methods deal with preparation of the articles to be recycled. The term "article," as used herein, is a broad term and means any item or object which is composed, at least in part, of hydroxy-phenoxyether polymer. In preferred embodiments, articles take the form of containers, coated paper, molded fiber, and packaging materials, including, but not limited to, those which are prepared in accordance with Applicant's aforementioned copending patent applications. The articles to be recycled 10 may come from any source, including, but not limited to, waste collectors, recyclables collectors and sorters, sanitation departments, or directly from the consumers. The recycled articles may also include manufacturing scrap material. As such, the articles often contain dirt, food particles, and other debris which should be removed. Additionally, the articles may also have labels, adhesive, or other items attached to them which should be removed. As such, a cleaning step may precede other steps in the recycling process 14. Cleaning may be accomplished by steam treatment in an aspirator, caustic wash, washing with water either with or without cleaning solution, or treatment by solvents or cleaning solutions not in the presence of water. Preferred cleaning solutions are those which do not dissolve the hydroxy-phenoxyether polymers, e.g. those which are neutral or basic in character or not good solvents for the plastic. Following exposure to the cleaning agents, the materials are optionally rinsed and/or dried before proceeding with the process.

Because some of the articles containing materials to be recycled are relatively large or, in the case of some bottles, contain only small openings into their interiors which could complicate processing by hindering the entry and removal of processing liquids, the articles are optionally granulated, chopped, shredded, comminuted, grated, or otherwise made into smaller pieces 12. The size of such pieces is not important. If both this step and the cleaning step are done in a given process, it is preferred that the cleaning step be done after the granulation, shredding, etc., although the steps may be done in either order.

Although the remaining portions of the recycling process may proceed with or without any preparation steps having been done, the discussion which follows will assume that the articles containing materials to be recycled have been processed into smallish pieces which are hereinafter referred to as "flakes."

alkanoic acids such as lactic acid and citric acid. Preferred inorganic acids include hydrochloric acid, phosphoric acid, hydrobromic acid, sulfuric acid, and phosphorous acid. In a preferred embodiment, acetic acid or phosphoric acid is used as the acid. Combinations of acids may also be used.

In accordance with preferred embodiments of the present invention, the acid solution used to dissolve the hydroxy-phenoxyether polymer is preferably about 1%, 5%, 10%, 15%, 20%, 25%, 30%, 35%, 40% 45% or 50% acid by weight, more preferably about 5%–20% acid by weight. The pH of the solution is preferably below pH 4, more preferably about pH 3.0–3.5. In some embodiments, the pH may be pH 2.5, pH 2.0, pH 1.5 or less.

The flakes are combined with the acid solution for a time period sufficient to result in dissolution of the hydroxy-phenoxyether polymer, preferably for period of about 1 minute to about 12 hours, more preferably for about 30 minutes to about 1 hour. Alternatively, the acid may be added to a mixture of the flakes in an aqueous medium. The solution and flakes are preferably stirred, sonicated or otherwise agitated to aid mixing and dissolution of the polymer. Although some dissolution may take place at room temperature, the process is generally sped up and made more complete by use of elevated temperature. If the temperature is elevated, preferred elevated temperatures are from about 60–150° C. If the acid used is acetic acid, lower temperatures may be used, preferably about 70–95° C.

Depending upon the type of acid, amount of acid, temperature and other such factors, the amount of hydroxy-phenoxyether polymer dissolved in the acid solution can vary. Solutions may be achieved containing about 2%–40% hydroxy-phenoxyether polymer solids by weight, with those containing about 5%–30% hydroxy-phenoxyether polymer solids by weight being preferred.

It is generally preferred at this stage of the process that the conditions are such that the dissolution of the hydroxy-phenoxyether polymer is substantially complete.

Separation

Following dissolution of the hydroxy-phenoxyether polymer, the hydroxy-phenoxyether polymer solution is separated from the other materials in the mixture, which are preferably solids which did not dissolve 18. Where the dissolution begins with flakes made from barrier-coated PET bottles, according to one preferred embodiment of recycling process, following dissolution what remains is a mixture comprising the acidic hydroxy-phenoxyether polymer solution and flakes of PET. Likewise, where the dissolution begins with flakes of paper made with hydroxy-phenoxyether polymer, according to another preferred embodiment of recycling process, following dissolution what remains is a mixture comprising the acidic hydroxy-phenoxyether polymer solution and the cellulosic or other such fibers from the paper.

The hydroxy-phenoxyether polymer solution may be separated from the solids by any method capable of separating solids and liquids, including, but not limited to, methods known in the art such as decantation, filtration, centrifugation, settling, pressing, use of a double belt thickener, and the like. Combinations of methods may also be used, for example, decantation of the bulk of the liquid followed by pressing of the remaining solids.

At this point in the preferred processes, the treatment of the materials follows separate paths for the solids and the hydroxy-phenoxyether polymer solution, as shown in FIGS. 1 and 2.

Treatment of the Hydroxy-Phenoxyether Polymer
Use of Solution

As noted in FIGS. 1 and 2, the hydroxy-phenoxyether polymer acidic solution may be used following separation in the form of a solution 22. The solution may be used without any further treatment, or additives may be added to the solution to achieve desired properties. For example, dyes or surfactants may be added to the solution. Such solutions, whether having undergone further treatment or not, may be used in various applications. Examples of such applications include, without limitation, those disclosed in Assignee's copending application entitled HYDROXY-PHENOXYETHER POLYMERS IN PAPERMAKING, application Ser. No. 09/745,013, filed on Dec. 20, 2000, which is incorporated by reference in its entirety.

Precipitation/Neutralization

Alternatively, the acidic hydroxy-phenoxyether polymer solution may undergo additional treatment to partially or fully precipitate the hydroxy-phenoxyether polymer from the solution to give a dispersion or solid 24. Precipitation, whether partial or complete, is done by addition of one or more basic (alkaline) materials. Preferably, the basic compound is a strong base such as sodium hydroxide or potassium hydroxide. Other preferred basic compounds include alkali metal (lithium, sodium, potassium, rubidium and cesium) and alkaline earth metal (beryllium, magnesium, calcium, strontium, and barium) hydroxides, phosphates, carbonates, silicates, borates, and the like, including, without limitation, sodium hydroxide, sodium tetraborate, sodium carbonate, sodium bicarbonate, sodium phosphate, potassium hydroxide, potassium carbonate, potassium phosphate, calcium carbonate, calcium hydroxide, calcium phosphate, magnesium hydroxide, or combinations thereof. Alkaline ammonium salts may also be used.

The degree of neutralization controls the degree of precipitation of the polymer from the solution, with the amount of precipitation increasing as more alkali is added. As more alkali is added, the solution becomes a dispersion of polymer particles in the acid solution, or the polymer particles fall out of the mother liquor and settle under the force of gravity. Generally speaking, as the pH of the solution approaches pH 4, precipitate may begin to form. As the pH rises above pH 4, the amount of precipitate increases, with more precipitate forming at pH 5 and pH 6, until at about pH 7 at which point precipitation (or dispersion formation) is substantially complete. Therefore, by controlling the pH of the solution between about pH 4 and pH 6–7, a desired degree of precipitation or dispersion may be achieved.

The manner in which neutralization is carried out also affects the resulting precipitate. If the base is added slowly, the precipitate which forms tends to be more uniform and of a moderate to small particle size. On the other hand, if the entire quantity of alkali needed to achieve the desired degree of neutralization is added quickly, the precipitate which forms tends to have a greater variety of particle sizes as well as having many more larger size particles as compared to the slowly neutralized material. Therefore, the speed of alkali addition can be used to promote a particular particle size which may be chosen, at least in part, depending upon the desired end use for the material.

Dispersions formed by solutions of various degrees of neutralization may be used without any further treatment, or additives may be added to the dispersion to achieve desired properties including, but not limited to, surfactants to maintain the dispersion, diluents and the like. Such dispersions, whether having undergone further treatment or not, may be used in various applications, including, without limitation, those disclosed in Assignee's aforementioned copending application entitled HYDROXY-PHENOXYETHER POLYMERS IN PAPERMAKING.

Isolation of Hydroxy-Phenoxyether Polymer Precipitate

Following a neutralization process, the hydroxy-phenoxyether polymer precipitate is separated from the liquid component or mother liquor from which the precipitate formed 26. The solids may be separated from the liquid by any method capable of separating solids and liquids, including, but not limited to, methods known in the art such as decantation, filtration, settling, centrifugation, pressing and the like. Combinations of methods may also be used. In the case where some precipitate has fallen out of solution prior to separation but some stays dispersed in the liquid phase, one may fully separate the solids and liquids by methods such as those noted above. Alternatively, in accordance with one embodiment of isolation process, one may decant the liquid dispersion for use as discussed above and then filter, press, or otherwise remove the remaining liquid from the solids.

Following the separation from the liquid portions, the hydroxy-phenoxyether polymer precipitate is optionally rinsed to remove any salts or other materials which may deposit on the precipitate from the liquid portions 28. Preferred rinsing media include water, preferably distilled and/or deionized water, and solvents in which the hydroxy-phenoxyether polymer is insoluble or only marginally soluble, with water being preferred. The rinse water may be heated to aid the dissolution of residues on the precipitate.

The precipitate is then preferably dried 28. Drying may be accomplished by air drying, vacuum drying with or without added heat, oven drying, IR lamp drying, desiccants, or other methods which aid in the evaporation or elimination of water. The choice of method may be influenced by factors such as degree of dryness needed and available equipment.

Further Processing of Precipitate

The precipitate may be used following drying or it may be processed before use. Examples of uses of the material either before or after further processing include, without limitation, those disclosed in Assignee's aforementioned copending application entitled HYDROXY-PHENOXYETHER POLYMERS IN PAPERMAKING, as well as Assignee's other copending applications entitled LAMINATES AND COATED MATERIALS COMPRISING HYDROXY-PHENOXYETHER POLYMERS, application Ser. No. 09/745,002, and HYDROXY-PHENOXYETHER POLYMER/FIBER COMPOSITES AND FOAMS, application Ser. No. 09/742,2 10, both of which were filed on Dec. 20, 2000 and are incorporated by reference in their entireties. The recycled hydroxy-phenoxyether polymer material may also be used in the processes for making barrier containers disclosed in WO 99/20462.

Further processing of the precipitate prior to use includes, without limitation, pulverization to form a powder and extrusion to form sheets or pellets 30. Such processing may include the addition of one or more additives. Suitable additives include, without limitation, mold release agents, dyes, and lubricants. The additives may be dry mixed with the hydroxy-phenoxyether polymer or added to a melt of the hydroxy-phenoxyether polymer.

Treatment of Non-Hydroxy-Phenoxyether Solids

Following separation of the acidic hydroxy-phenoxyether polymer solution, the solid materials which remain are preferably prepared for reuse. Whether such materials may be reused, or how they are prepared for reuse depends upon the material itself. The discussion below is limited to three preferred embodiments in which the solid materials left after separation of the polymer solution are PET flakes or fibers. However, the discussion which follows may be extrapolated to other materials, including, but not limited to fillers including silica, talc, etc. As such, the discussion below is not intended to exclude applications of the method to materials other than PET and fiber, or to exclude other methods which still fall within the scope of the attached claims. The term "fiber," as used herein, is a broad term used in its ordinary sense, including but not limited to fibrous materials including wood pulp, cotton fibers, hemp, bagasse, abaca, flax, southern pine, southern hardwood fibers, cellulose, wheat, starch, modified starch, chitin, chitosan, keratin, cellulose acetate, cellulose materials derived from agricultural products, gluten, nut shell flour, wood flour, corn cob flour, guar gum, polymeric or plastic threads.

In the case of PET flakes originating from barrier-coated PET bottles, according to one preferred embodiment of recycling process, following separation from the hydroxy-phenoxyether polymer solution, the flakes 20 are preferably rinsed with water 32. The rinse water is preferably deionized and/or distilled, and either neutral or slightly acidic so as to deter precipitation of any hydroxy-phenoxyether polymer onto the PET flakes during rinsing. In accordance with one preferred embodiment, the flakes are first rinsed with an acidic solution having a pH below about pH 4, followed by a second rinse with water having a pH at or near neutral.

Following rinsing, the flakes are preferably dried 32. Drying may be accomplished by air drying, vacuum drying with or without added heat, oven drying, IR lamp drying, desiccants, or other methods which aid in the evaporation or elimination of water. The choice of method may be influenced by factors such as degree of dryness needed and available equipment.

The PET flakes may be used following drying or they may be processed 34 before use. Further processing prior to use includes, without limitation, pulverization to form a powder and extrusion to form sheets or pellets of recycled PET. Such processing may include the addition of one or more additives. Suitable additives include, without limitation, mold release agents, dyes, other polymers, and lubricants. The additives may be dry mixed with the PET flakes or added to a melt of the PET prior to formation into final shape or form.

Examples of preferred uses of the material either before or after further processing include, without limitation, use in the processes for making barrier containers disclosed in WO 99/20462, as well as in the extruded containers and profiles disclosed in WO 00/03922.

In the case of fibers from articles made from fibers and hydroxy-phenoxyether polymer, according to another preferred embodiment of recycling process, following separation from the hydroxy-phenoxyether polymer solution, the fiber 36 is preferably rinsed with water 38. The rinse water may be deionized and/or distilled, and is preferably either neutral or slightly acidic so as to deter precipitation of any hydroxy-phenoxyether polymer onto the fiber during rinsing. In one embodiment, counter-current multi-stage washing is used to reduce the demand for high cost purified water. Such technology is well known in wastepaper deinking processes. In accordance with one preferred embodiment, the fiber is first rinsed with an acidic solution having a pH below about pH 4, followed by a second rinse with water having a pH at or near neutral.

Following rinsing, the fiber may undergo one or both of drying and further processing 40 prior to storage and/or reuse. Drying may be accomplished by air drying, vacuum drying with or without added heat, oven drying, IR lamp drying, desiccants, or other methods which aid in the evaporation or elimination of water. The choice of method may be influenced by factors such as degree of dryness needed and available equipment.

Further processing may be done to influence properties of the fiber which may enhance its use in applications including, but not limited to those discussed hereinbefore with reference to Applicant's copending applications filed on a date even herewith. One preferred type of processing is treatment to improve the surface reactivity of the fiber to enhance the ability of the fiber to adhere or bond to other materials, including hydroxy-phenoxyether polymer. Such treatment may be done by chemical or electrochemical means. For example, one may increase the ionic character of the fiber to enhance ionic bonds between the fiber and other materials. Effective deposition of polymer on fiber occurs when the polymer particles and the fibers are oppositely charged. Ionic sites on the fiber, whether anionic or cationic, can be established by using reactive products. Suitable compounds and methods include addition of alum, modified starches (cationic, anionic or amphoteric), locust bean gum, cationic guar (galactomannan) gum, polyaluminum chloride (PAC), polyacrylamides (cationic, anionic, or amphoteric), microparticulate silica, zeolite, poly diallyl-dimethyl ammonium chloride (or polyDADMAC), polyethylene-imine (PEI), polyethylene amine, and diamine- and dicyanoamide polymers.

Another fiber processing treatment is treatment of the fiber with wetting agents, surfactants, and acids or bases. Wetting agents aid intimate contact of the fiber with other materials. Surfactants, whether cationic, nonionic or amphoteric, can improve bonding by helping to reduce surface tension or increase fiber hydrophobicity.

Figure 3:
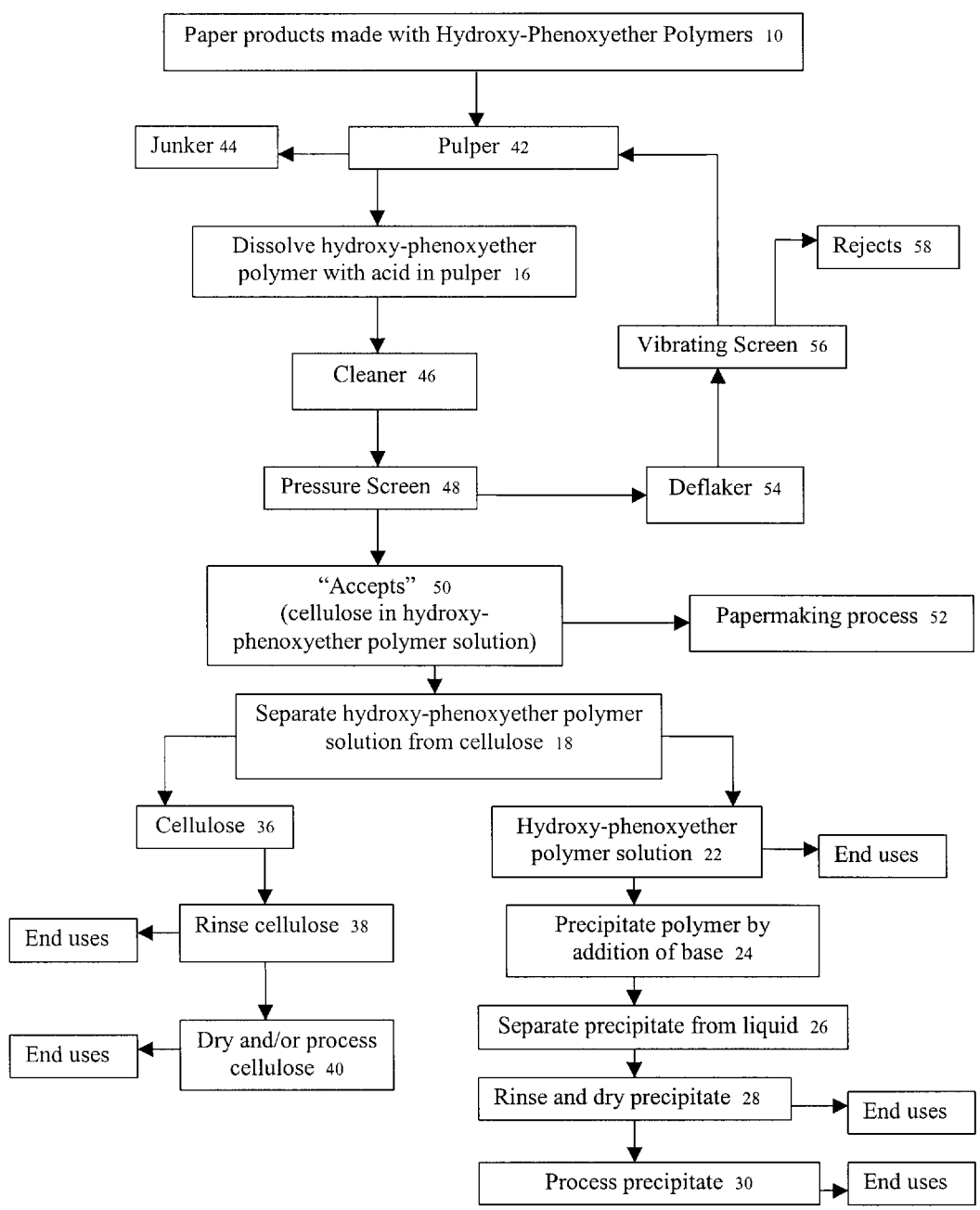
FIG. 3 is a flow chart showing a recycling and fiber recovery process using a pulper for articles made of fiber and hydroxy-phenoxyether polymer according to another preferred embodiment of the present invention.

Paper and other articles treated with lower levels of hydroxy-phenoxyether polymer for sizing and lower levels of dry or wet strength could be treated as part of a conventional paper mill recycling system, enabling the cellulose or other such fibers to be recovered and reused without recycling the polymer. If, however, the article or paper has higher levels of hydroxy-phenoxyether polymer or if recycling of the hydroxy-phenoxyether polymer is desired, a preferred method for such recycling is shown in FIG. 3. Referring to FIG. 3, there is an alternate method of recycling articles made from fiber and hydroxy-phenoxyether polymer, described in terms of a preferred embodiment using paper made from cellulose.

Paper for recycling is usually baled and brought to the mill. The bales are dropped into the pulper 42, which is usually in the form of a large vat containing water and fitted with a high-shear agitator. The combination of wetting and mechanical action breaks the hydrogen bonds among the cellulose fibers to make a pulp slurry. The water in the pulper is acidified 16, as discussed above, to dissolve the hydroxy-phenoxyether polymer. Baling wires and other gross contaminants are removed from the pulper by a 'junker' 44. The pulp and hydroxy-phenoxyether polymer solution is discharged from the pulper and then cleaned 46 and screened 48 to further remove contaminants.

The cleaning is preferably done by a centrifugal cleaner, such as those commonly found in mineral separation as well as the pulp and paper industry. The basis of their operation is the formation of a cyclone or vortex in the body of the cleaner which forces lighter material to the outside and leaves heavier material in the center. The lighter and heavier materials may then be separated. In papermaking, the heavier fractions are usually the rejects, and the lighter fractions, comprising the fiber, are usually the accepts. The screening is preferably done by an apparatus which contains a basket made either of woven wire mesh or a sheet metal drum with slots cut through. The basket has rotating foils or other such elements inside, which help to reduce blocking of the slots or holes in the basket. The stock is pumped into the screen under pressure. Rejects stay within the basket and are extracted from therein and the accepts (fiber) flow to the outside. In a preferred embodiment, a basket screen with holes about 1–3 mm diameter, will be run ahead of a slotted screen in order to remove larger pieces of unwanted material that might block the slotted screen.

The good fiber together with the hydroxy-phenoxyether polymer solution, 'accepts' 50, may be processed to make paper 52 or they may undergo a separation process 18. Preferably, separation of the cellulose fibers and hydroxy-phenoxyether polymer solution, and any further processing of the fibers and/or hydroxy-phenoxyether polymer solution proceeds as discussed above.

Materials which are not "accepts" pass into the deflaker 54 and then through a vibrating screen 56. The deflaker 54 may be of any type, including, but not limited to the type which contains two toothed discs: one fixed and one stationary. The fiber suspension is pumped between the discs and their action breaks up fiber clumps or flakes. The vibrating screen 56, according to one embodiment, is a horizontal screen or perforated metal tray which is shaken to assist the passage of fiber through it. The unwanted material, or contraries, are retained on top and gradually moved to the end of a tray and into a rejects hopper under the influence of the vibration. After these steps, any usable pulp material is then redeposited in the pulper 42 with the remaining undesirable materials being discarded as "rejects" 58.

Figure 4:
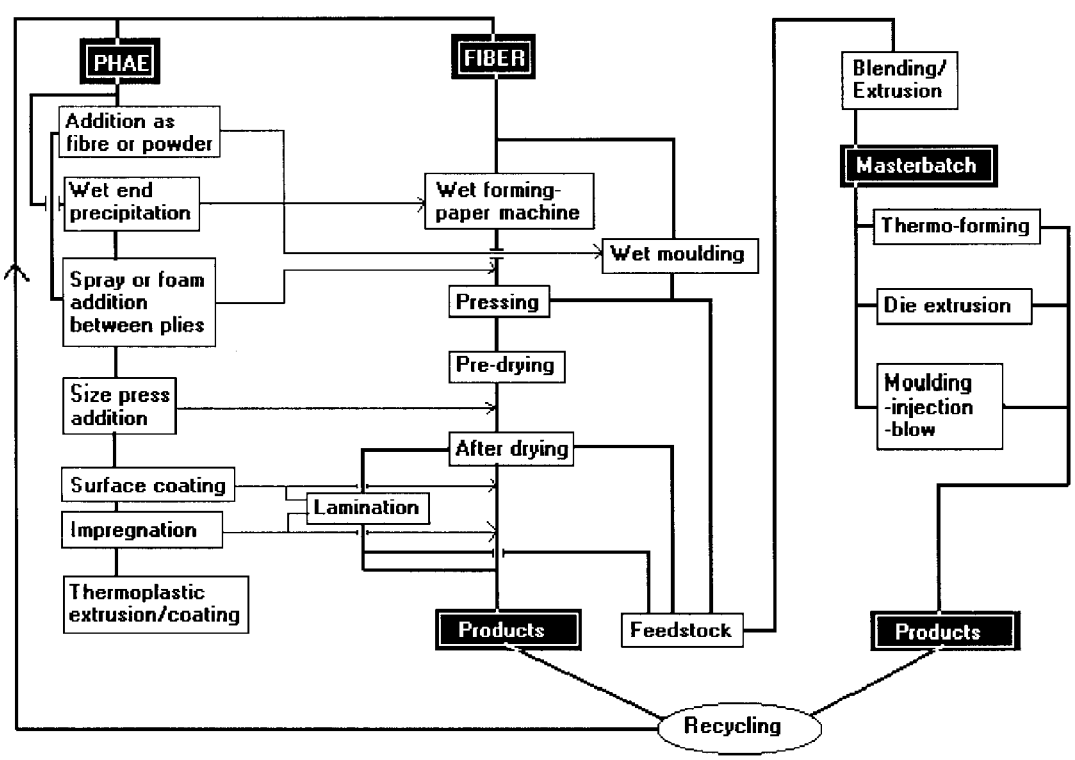
FIG. 4 is a flow chart showing preferred sources of and uses for a preferred recycled hydroxy-phenoxyether polymer, poly(hydroxyamino ethers) ("PHAE") and recycled fibers.

One preferred scheme of reuse and recycling of a preferred hydroxy-phenoxyether polymer and fibers is shown in FIG. 4. The figure illustrates a scheme in which products are placed in a recycling process and the materials which comprise the products, a preferred hydroxy-phenoxyether polymer and fiber, are reused in the processes to make the products. Such a scheme, by providing for reuse of materials, can allow for reduction in consumption of materials.

Although the present invention has been described in terms of certain preferred embodiments, and certain exemplary methods, it is to be understood that the scope of the invention is not to be limited thereby. FIGS. 1, 2, 3, and 4, as well as the preceding description are intended to be only exemplary, and may contain a larger or smaller number of process steps than other methods which fall within the scope of the invention as claimed. Instead, Applicant intends that the scope of the invention be limited solely by reference to the attached claims, and that variations on the methods and materials disclosed herein which are apparent to those of skill in the art will fall within the scope of Applicant's invention.

What is claimed is:

1. A method of obtaining recycled hydroxy-phenoxyether polymers from articles comprising hydroxy-phenoxyether polymers, comprising:

providing an article comprising a hydroxy-phenoxyether polymer;

contacting the article with an aqueous solution comprising 1–50% acid by weight to at least partially dissolve the hydroxy-phenoxyether polymer to form an acidic hydroxy-phenoxyether polymer solution;

separating the acidic hydroxy-phenoxyether polymer solution from any solids present;

adding a base to the acidic hydroxy-phenoxyether polymer solution to form a hydroxy-phenoxyether polymer precipitate; and separating the hydroxy-phenoxyether polymer precipitate.

2. The method of claim 1, wherein the hydroxy-phenoxyether polymer is a poly(hydroxyamino ether).

3. The method of claim 1, wherein the acid is acetic acid or phosphoric acid.

4. The method of claim 1, wherein the base is a hydroxide of an alkali metal or alkaline earth metal.

5. The method of claim 1, wherein the aqueous solution comprises 10–20% acid by weight.

6. The method of claim 1, further comprising cleaning and processing the article into smaller pieces prior to contacting the article with acidic aqueous solution.

7. The method of claim 1, further comprising rinsing and drying the hydroxy-phenoxyether polymer precipitate following its separation.

8. The method of claim 7, further comprising processing the hydroxy-phenoxyether polymer precipitate after drying by a method selected from the group consisting of pelletizing, pulverizing, grinding, extrusion, molding, and compounding.

9. A method of isolating a hydroxy-phenoxyether polymer from a composite material, comprising:

provinding a composite material wherein the composite material comprises hydroxy-phenoxyether polymer;

contacting the composite material with an aqueous solution having a pH below about pH 4 to form dissolved hydroxy-phenoxyether polymer and solid material, wherein the solid material comprises undissolved composite material;

separating the dissolved hydroxy-phenoxyether polymer from the solid material;

adding a base to the dissolved hydroxy-phenoxyether polymer in a quantity sufficient to raise the pH to at least pH 6, thereby forming hydroxy-phenoxyether polymer precipitate; and isolating the hydroxy-phenoxyether polymer precipitate.

10. A method of recycling barrier containers comprising polyethylene terephthalate and hydroxy-phenoxyether polymer, comprising:

processing the barrier containers into smaller pieces;

contacting the pieces with an aqueous solution having a pH below about pH 4, thereby forming a mixture comprising acidic hydroxy-phenoxyether polymer solution and polyethylene terephthalate pieces;

separating the polyethylene terephthalate pieces from the acidic hydroxy-phenoxyether polymer solution;

precipitating the acidic hydroxy-phenoxyether polymer solution by adding an alkaline material until the pH has been raised to at least pH 6; and isolating the hydroxy-phenoxyether polymer precipitate.

11. The method of claim 10, further comprising rinsing and drying the polyethylene terephthalate pieces following their separation from the acidic hydroxy-phenoxyether polymer solution.

12. The method of claim 10, further comprising rinsing and drying the hydroxy-phenoxyether polymer precipitate following its isolation.

13. The method of claim 10, further comprising processing at least one of the polyethylene terephthalate pieces and hydroxy-phenoxyether polymer precipitate to form pellets or granules of recycled material.

14. The method of claim 10, wherein the aqueous solution has a pH at or below pH 3.5.

15. A method of recycling articles comprising cellulose fiber and hydroxy-phenoxyether polymer, comprising:

contacting the article with an aqueous solution having a pH below about pH 4, thereby forming a mixture comprising aqueous hydroxy-phenoxyether polymer and cellulose fiber;

separating the cellulose fiber from the aqueous hydroxy-phenoxyether polymer;

raising the pH of the aqueous hydroxy-phenoxyether polymer to at least pH 6, thereby precipitating at least some of the hydroxy-phenoxyether polymer; and isolating the precipitated hydroxy-phenoxyether polymer.

16. The method of claim 15, further comprising rinsing and drying the cellulose fiber following its separation from the aqueous hydroxy-phenoxyether polymer.

17. The method of claim 15, further comprising rinsing and drying the hydroxy-phenoxyether polymer precipitate following its isolation.

18. The method of claim 15, wherein the aqueous solution placed in contact with the article has a pH at or below pH 3.5.

19. A method of obtaining recycled hydroxy-phenoxyether polymer solution from articles comprising hydroxy-phenoxyether polymers, comprising:

providing an article comprising a hydroxy-phenoxyether polymer;

contacting the article with an aqueous solution having a pH below about pH 4 to at least partially dissolve the hydroxy-phenoxyether polymer to form an acidic hydroxy-phenoxyether polymer solution; and separating the acidic hydroxy-phenoxyether polymer solution from any solids or other materials present to isolate the hydroxy-phenoxyether polymer solution.

20. The method of claim 19, further comprising cleaning and processing the article into smaller pieces prior to contacting the article with the acidic aqueous solution.

* * * * *